UNITED STATES PATENT OFFICE.

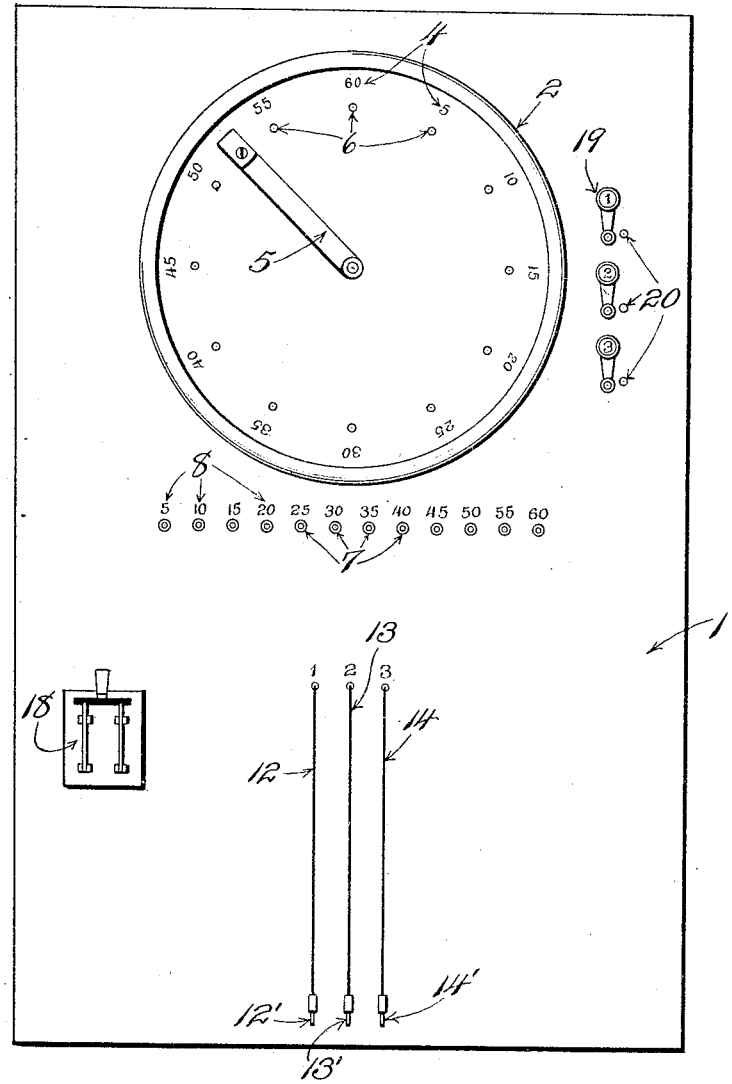

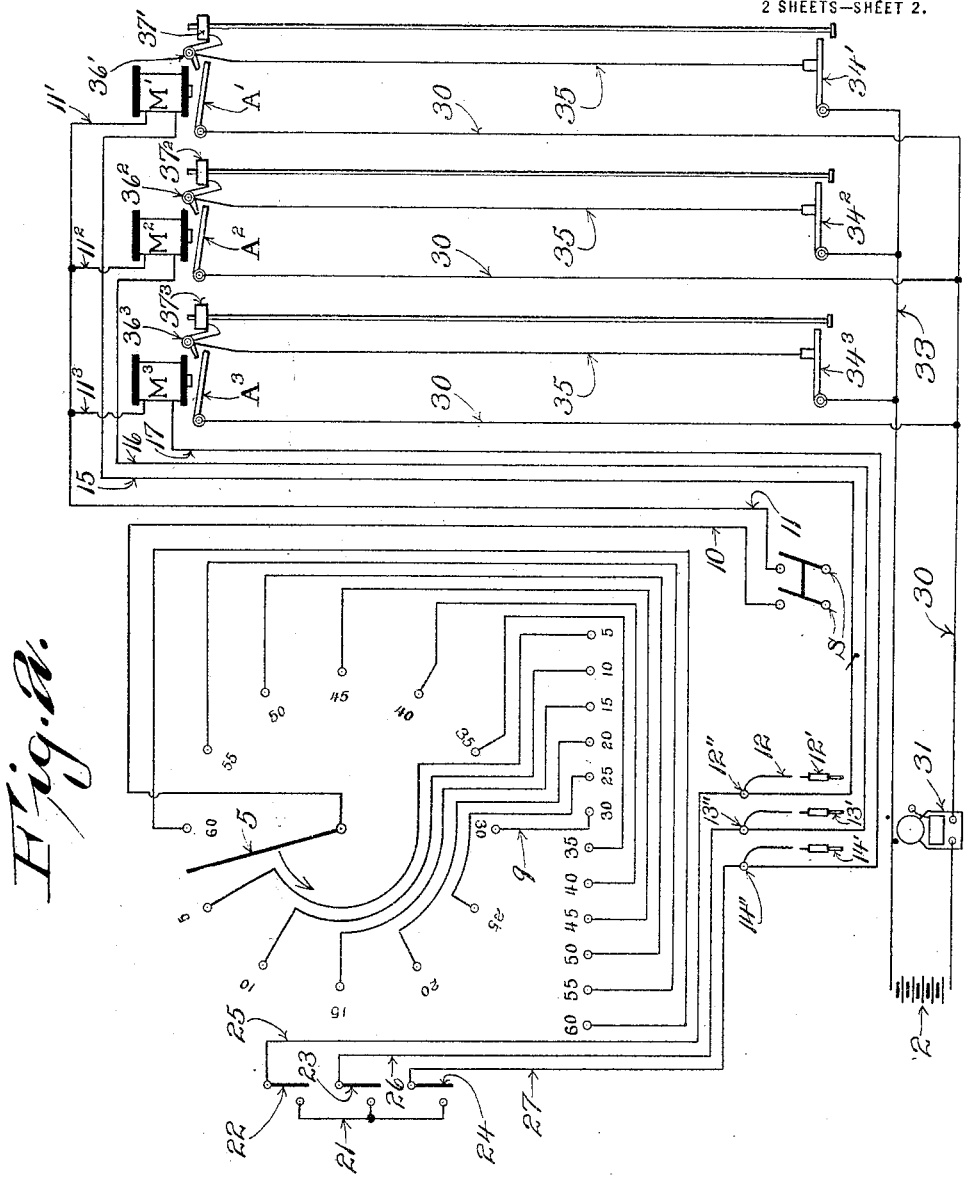

ALBERT W. MEYERS, OF MILWAUKEE, WISCONSIN.

AUTOMATIC SWITCHBOARD.

1,366,202.              Specification of Letters Patent.         Patented Jan. 18, 1921.

Application filed August 9, 1920. Serial No. 402,197.

*To all whom it may concern:*

Be it known that I, ALBERT W. MEYERS, a citizen of the United States, and resident of Milwaukee, in the county of Milwaukee and State of Wisconsin, have invented certain new and useful Improvements in Automatic Switchboards; and I do hereby declare that the following is a full, clear, and exact description thereof.

My invention relates to new and useful improvements in means for automatically controlling the operation of electrically actuated devices of various kinds. The embodiment illustrated in the present application is designed for use in connection with electro-magnets, the purpose of which is depicted in my co-pending patent application for improvements in tire vulcanizers.

The principal object of the invention is to provide an arrangement whereby variable intervals of time may be allowed to elapse between the moment of setting the apparatus in operation and the actuation of the electrically controlled devices, for instance the electro-magnets. In this connection a plurality of the electro-magnets or like devices may be successively and independently actuated or simultaneously actuated. It is also an object of the invention to provide an alarm in connection with each of the electrically operated devices, such as the electro-magnets, said alarms being either independently sounded or simultaneously sounded, depending upon the actuation of the devices with which they are connected.

With these and other objects in view which will become apparent as the description proceeds, the invention resides in the novel features of construction, combination and arrangement of parts which will be hereinafter more particularly described and claimed and shown in the drawings wherein:

Figure 1 represents a front elevational view of a switchboard constructed in accordance with my invention, and Fig. 2 is a diagrammatic view of the wiring used in this invention, the clock mechanism thereof being viewed from the rear, however.

In these illustrations the apparatus is provided only with three electro-magnets M', M² and M³ which, in a conventional way represent the electrically actuated devices to be controlled by the principal parts of the invention, but it is to be understood that by multiplying the parts in coördination with the increase in the number of electro-magnets, that the number thereof which may be operated upon is indefinite. Therefore the invention is not to be limited to the exact showing in the drawing.

The major portion of the wiring shown in diagrammatic Fig. 2 is mounted behind a switchboard 1 on the upper portion of which is secured a clock 2 including conventional clock mechanism (not shown), a dial 3 graduated into sixty parts as shown by the characters 4 which extend in a clockwise direction, and a hand in the form of a movable switch or contact arm 5. Said characters 4 divide the dial into sixty parts in intervals of fives, each of which represents five minutes, and inwardly of each of the characters is a stationary contact point 6 with which the said contact arm is brought into engagement by the clock mechanism.

Below the dial 3 is a series of sockets 7, the number of which correspond with the number of stationary contacts 6, and adjacent each of these sockets is a character 8 which corresponds to the characters 4. Thus since the characters on the dial 3 run from five to sixty in multiples of five, the characters 8 correspond similarly therewith. Each of the stationary contacts 6 is connected by a conductor wire 9 with one of the sockets 7, the contact 6 adjacent the character "5" being connected with the socket 7 which is adjacent the character "5," the contact located near the character "10," being connected with the socket adjacent the character "10," and so forth. The movable contact arm 5 is connected with one side of the source of supply S by a conductor wire 10 as shown in the diagram.

The other side of the source of supply S of electrical current is connected by a conductor 11 to each of the several electro-magnets M', M² and M³ by conductor wires 11', 11² and 11³ respectively. Also disposed on the switchboard 1 are outlets for plug cords 12, 13 and 14 each of which has a plug 12', 13' or 14' fixed to its free end for engagement in any of the sockets 7. The electro-magnet M' has a conductor wire 15 extending therefrom to the binding post 12" with which the plug cord 12 is connected, the electro-magnet M² being similarly connected by a conductor wire 16 with the post 13" of the plug cord 13, and the electro-magnet M³ is likewise connected through a conductor wire 17 with the binding post 14" of the plug cord 14. Thus for each electro-magnet or other electrically actuated device corresponding thereto is provided with a plug cord on the switchboard 1. In other words the number of electro-magnets or the like is the same as the number of plug cords.

On the switchboard in addition to the other elements heretofore described is a two-pole knife switch 18 for controlling the current from the source of supply S, and a plurality of switches 19, the number of which correspond with the number of plug cords 12, 13 and 14. Each of the switches 19 includes a stationary contact 20, all of which are connected together by a conductor 21, and a movable contact 22, 23 or 24. From Fig. 2 it will be noticed that the movable contact 22 is connected with the binding post 12'' by a conductor wire 25 and that the movable contacts 23 and 24 are similarly connected to the binding posts 13'' and 14'' respectively by conductors 26 and 27 respectively. The closing of the switches 19 include the movable contacts 22 and 23 is similar to bridging the binding posts 12'' and 13'', or if all of the switches 19 are closed, all of said binding posts 12'', 13'' and 14'' will be connected.

Armatures A', A² and A³ are provided for coöperation with the electro-magnets M', M² and M³ respectively, and each of the armatures is electrically connected by conductors 30 with an electric bell 31, the sounding of which is procured by a battery 32. This battery 32 is connected by a conductor wire 33 with each of several circuit breaker arms 34', 34² and 34³, the stationary elements of said circuit breakers being respectively connected by conductor wires 35 to latches 36', 36² and 36³.

These latches 36', 36² and 36³ are so arranged with respect to the armatures A', A² and A³ that when either of the latter is attracted by its corresponding electro-magnet, the adjacent latch will be actuated to release one of the circuit breaker weights 37', 37² and 37³. These weights are slidable on rods 38 and when released will move thereedown until contact is had with the circuit breaker arms 34', 34² or 34³.

The method of operating my invention wherein each of the electro-magnets M', M² and M³ is to be independently actuated is as follows: It will be assumed that it is desired to actuate the electro-magnet M' five minutes after the starting of a certain operation, the electro-magnet M² fifteen minutes after such start, and the electro-magnet M³ ten minutes thereafter, thereupon after closing the switch 18 to permit the flow of electricity from the source of supply, the plug 12' which is connected with the electro-magnet M² is inserted in the socket 7 over which is located the character "5," the plug 13' is inserted in the socket 7 designated by the character "15," and the plug 14' is inserted in the socket having the character "10" thereadjacent. The switches 19 being all open, the movable contact arm 5 of the clock mechanism is moved to the zero point thereon, or its equivalent which in the present instance is adjacent the character "60," whereupon the clock mechanism is started to move the arm 5 in a clockwise direction.

Five minutes after the clock mechanism is started said movable contact arm 5 will engage the first stationary contact 6 thereby permitting current to flow from the source of supply S through the conductor 10, the movable contact arm 5, the conductor wire 9 connecting the stationary contact adjacent the character "5" and its corresponding socket 7, through the plug cord 12, the conductor 15 to the electro-magnet M', thereby energizing the same. The current returns to the source of supply from the electro-magnet M' through a conductor 11' and a second conductor 11. The energization of the electro-magnet M', of course, attracts the armature A' thus engaging it with the latch 36' and completing the alarm circuit to the bell 31. Simultaneously with the engagement of the armature A' with the latch 36', the latter will be tripped to release the circuit breaker weight 27 to permit the same to drop by gravity onto the circuit breaker arm 34', the opening of this circuit breaker disconnects the bell circuit and discontinues the sounding thereof.

During this time the movable contact arm 5 has continued to travel in a clockwise direction so that ten minutes after the clock mechanism was started, the second stationary contact 6 designated by the character "10" will be engaged thus completing the electrical circuit to the electro-magnet M³. The circuit flows through conductor wires corresponding to the wires through which the current passed to the electro-magnet M' as above set forth. Likewise the closing and opening of the bell circuit through the armature A³ is carried out in the same manner as heretofore explained with respect to the circuit controlled by the armature A'. And fifteen minutes after the clock mechanism is started the other electro-magnet M² will be energized, this also being accomplished as hereinbefore set out. The energization of this electro-magnet M² similarly makes and breaks the alarm circuit.

After all of the electro-magnets have been actuated, the apparatus may be again set, the several plugs being separately disposed in different sockets 7. As a result of this variation either of said electro-magnets may be energized any time desired after the starting of the clock mechanism, the interval of time depending entirely upon which of the sockets 7 receives the plug corresponding to that particular electro-magnet.

A slightly different manipulation of the several parts of the apparatus is necessary if it is desired that two or more of the electro-magnets be simultaneously actuated. It will be assumed that if it is desired to simultaneously operate the electro-magnets M' and M³, the electro-magnet M² is not to be actuated. Therefore after closing the switch 18 the movable contacts 22 and 24 of the switches 19 are engaged with their stationary contacts 20. Then upon inserting either the plug 12' or 14' in the proper socket, for instance that located adjacent the character "20," the movable contact arm 5 is placed on zero and the clock mechanism started. In twenty minutes the stationary contact on the dial 3 adjacent the character "20" will be engaged and the circuit completed to both of the electro-magnets M' and M³. The closing of the two switches 19 in effect bridges the binding posts 12" and 14" as hereinbefore mentioned so that the current passing through the plug cord 12 or 14 as the case may be is split and passes therefrom through both the conductor wires 15 and 17. Otherwise the operation of the apparatus is similar when two or more of the electro-magnets are to be simultaneously actuated and when two or more of the same are to be independently operated.

By a third method of operation two of the electro-magnets may be simultaneously actuated and the third operated independently thereof and at a different time. The disposition of parts in such a method, however, will be obvious after the explanations with respect to preceding methods and therefore need not be particularly set out.

I claim:

In combination, a pair of electrically actuated devices, a switch including a plurality of stationary contacts, and a time-controlled movable contact successively engageable with the stationary contacts, means connecting the devices and the movable contact, a connection from each of said devices, said connections being adapted to be selectively and separately engaged with any of said stationary contacts, said devices thereby being independently actuated when the movable contact is engaged with the stationary contacts having said connections attached thereto, and means for joining the two connections whereby when one of the same is attached to either of said stationary contacts, the devices will be simultaneously actuated when the last mentioned stationary contact is engaged by the movable contact.

In testimony that I claim the foregoing I have hereunto set my hand at Milwaukee, in the county of Milwaukee and State of Wisconsin.

ALBERT W. MEYERS.